United States Patent [19]
Harvey et al.

[11] Patent Number: 5,887,733
[45] Date of Patent: Mar. 30, 1999

[54] MODULAR TOWER TOOLING SYSTEM

[75] Inventors: Robert A. Harvey, Castle Rock, Colo.; H. James Vander Wal, III, Ada, Mich.

[73] Assignee: OMNI Structures International, Inc., Ada, Mich.

[21] Appl. No.: 633,968

[22] Filed: Apr. 19, 1996

[51] Int. Cl.$^6$ .................................. A47F 5/14; B23Q 1/25
[52] U.S. Cl. ........................... 211/182; 211/194; 211/189; 269/900
[58] Field of Search ...................................... 211/189, 194, 211/182; 269/900, 45, 152, 91; 403/6, 7, 8, 19, 388, 306, 337

[56] References Cited

U.S. PATENT DOCUMENTS

| | | | |
|---|---|---|---|
| 1,431,823 | 10/1922 | Leconte | 211/182 X |
| 2,317,348 | 4/1943 | Wekeman . | |
| 2,748,954 | 6/1956 | Murren | 211/182 X |
| 2,782,574 | 2/1957 | Copold . | |
| 2,991,669 | 7/1961 | Stock | 269/152 X |
| 3,061,055 | 10/1962 | Nijhuis | 403/7 |

(List continued on next page.)

FOREIGN PATENT DOCUMENTS

| | | | |
|---|---|---|---|
| 250623 | 3/1966 | Germany | 211/182 |

OTHER PUBLICATIONS

"R & R Fixture From Rayco –Operations Manual," published by Rayco Manufacturing, Inc., date unknown.
Product brochure entitled "FXT Tool System –Beta 1 Catalog," published Jan. 1990, by Flexx Automation Systems, Inc.
Product brochure entitled "Stevens Modular Tooling –Height Locators," published Jun. 1989, by Carr Lane Manufacturing Co.
"Efficient and cost effective use of modular fixture kids at the machine site," published 1983, by Gaillien and Hammer.
Catalog entitled "Modular Fixturing System," published 1986, by Blüco Technik.

*Primary Examiner*—Daniel P. Stodola
*Assistant Examiner*—Gregory J. Strimbu
*Attorney, Agent, or Firm*—Van Dyke, Gardner, Linn & Burkhart, LLP

[57] ABSTRACT

A modular tooling system having two or more base plates joined by elongated extender members and having a tubular member with opposite ends which are closed by cover members, each of which has an inner portion dimensioned to fit within the interior of the tubular member. The cover members are formed with through-holes with one of the cover members formed with threaded through-holes while the through-holes of the other cover member are non-threaded. An access opening, positioned in the side of the tubular member and proximate to the non-threaded through holes, permits the removal and insertion of fasteners into the non-threaded through holes for engagement with the threaded through-holes of the cover member attached to another tubular member or to threaded through-holes formed in one of the base plates. Alternatively, a double threaded, dowel fastener may be used to join the cover members each having threaded through-holes, of two tubular members. The dowel fastener includes a first threaded portion and a smaller threaded portion separated by a dowel section. The first threaded portion threadably engages the threaded through-holes of one of the cover members while the smaller threaded portion is dimensioned to pass through the through-holes of the abutting cover member and receive a rotating fastener. Each tubular member is preferably a quadrilateral with opposing sidewall pairs, each pair having matching through-holes defined in said sidewall pairs. The matching through-holes receive an insert formed with an enlarged head and elongated body with an matching axial opening running therethrough. The axial opening of the insert may be threaded to enable attachment of components to the sides of the tubular member. Alternatively, the axial opening of the insert is non-threaded, permitting attachment of a workpiece to one side of the tubular member.

20 Claims, 6 Drawing Sheets

U.S. PATENT DOCUMENTS

| | | | |
|---|---|---|---|
| 3,129,472 | 4/1964 | Hensel | 403/7 |
| 3,292,323 | 12/1966 | Hagan | 211/182 X |
| 3,332,374 | 7/1967 | Ferdinand et al. | 211/182 X |
| 3,513,606 | 5/1970 | Jones | 211/182 X |
| 3,520,055 | 7/1970 | Jannett . | |
| 3,643,935 | 2/1972 | Bell | 269/152 X |
| 3,648,404 | 3/1972 | Ogsbury et al. . | |
| 3,837,754 | 9/1974 | Malcik | 211/189 X |
| 3,864,051 | 2/1975 | Reid | 211/182 X |
| 3,912,410 | 10/1975 | Pofferi | 211/182 X |
| 3,917,319 | 11/1975 | Kloesel et al. | 403/19 X |
| 4,073,215 | 2/1978 | Coope et al. . | |
| 4,174,847 | 11/1979 | Wiesler . | |
| 4,258,928 | 3/1981 | Wiesler . | |
| 4,630,811 | 12/1986 | Rudisill | 269/900 X |
| 4,640,501 | 2/1987 | Poland . | |
| 4,682,906 | 7/1987 | Rückert et al. . | |
| 4,722,564 | 2/1988 | Witte . | |
| 4,723,766 | 2/1988 | Beeding . | |
| 4,756,639 | 7/1988 | Hoshino | 403/306 X |
| 4,805,887 | 2/1989 | Ray . | |
| 4,828,240 | 5/1989 | Longenecker et al. | 269/900 X |
| 4,886,257 | 12/1989 | Witte . | |
| 4,934,670 | 6/1990 | Witte . | |
| 4,979,843 | 12/1990 | Perry | 103/19 |
| 5,013,017 | 5/1991 | Swann | 269/900 X |
| 5,288,191 | 2/1994 | Rückert et al. . | |
| 5,462,263 | 10/1995 | Feltrin | 269/900 X |

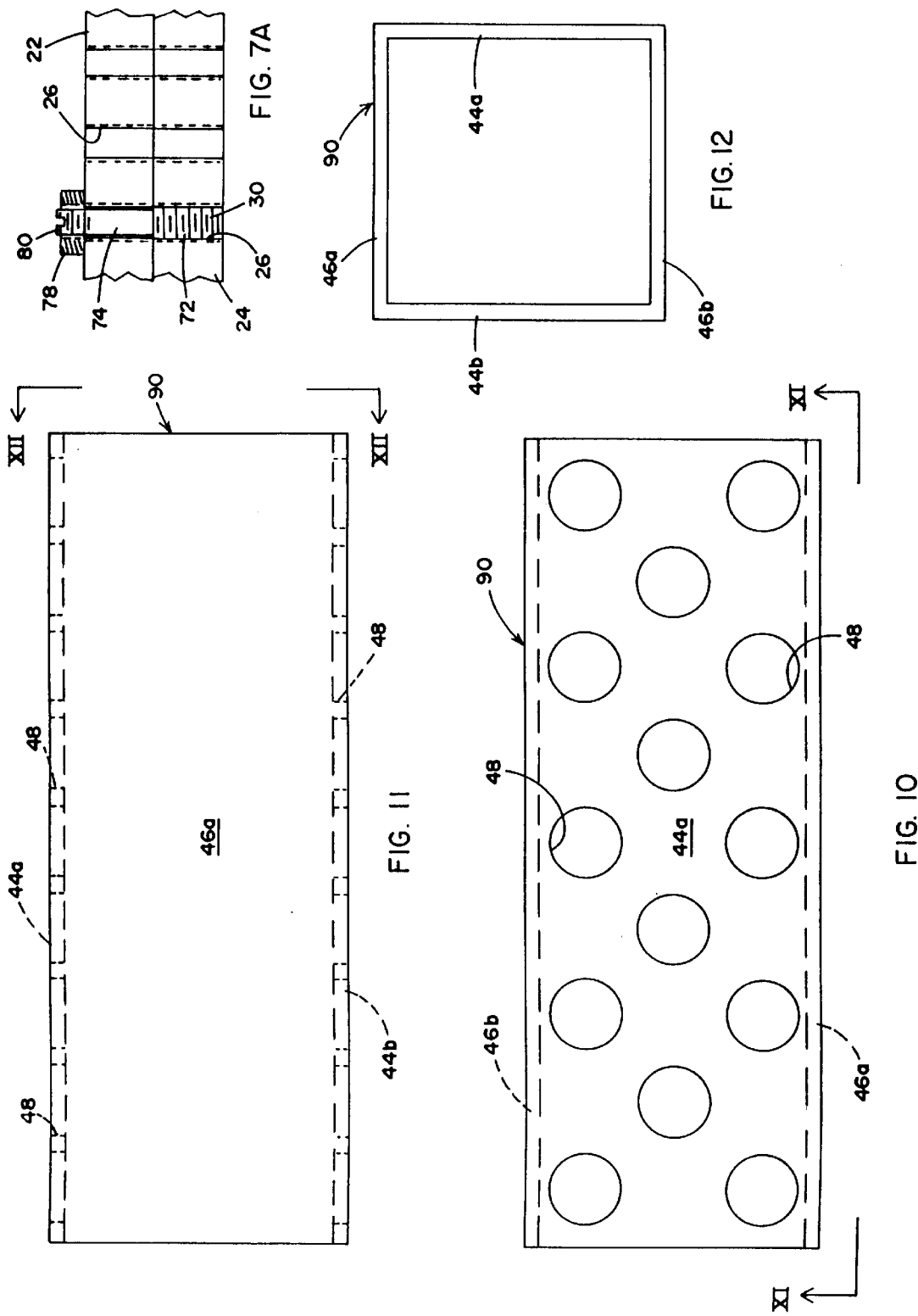

MODULAR TOWER TOOLING SYSTEM

BACKGROUND OF THE INVENTION

This invention relates to machine tooling and, in particular, to fixturing used to support an object undergoing one or more steps in a manufacturing process. The invention is particularly adapted for supporting a component undergoing quality control inspection by a computerized measuring machine (CMM), but may also find application in supporting objects undergoing light to moderate manufacturing processing, such as assembling, soldering, laser- and water-jet cutting, welding, light-machining, and the like.

Support fixtures for objects undergoing manufacturing operations have, in the past, been provided in the form of custom-built fixtures which are capable of supporting only one object, or a series of related objects, for one or more steps in a manufacturing process. When the particular object is not in production, the fixture must be stored for possible use at a later date. Whenever a new component is introduced, or an old component substantially redesigned, a new custom fixture must be designed and built. Not only does this result in an ongoing expenditure for fixturing, but requires an ever-increasing facility to store the fixtures. Furthermore, the fixture is typically designed and built by persons who will not actually use the fixture and modifications to the fixture, once completed, are either difficult or not possible. Therefore, results are not always satisfactory.

Various attempts have been made at modular fixtures in order to overcome such deficiencies. Modular fixturing includes providing a series of components which may be interconnected in a virtually infinite number of ways in order to allow a particular fixture to be disassembled and the components reused in a different fixture configuration. Various techniques are known for recording the configuration of the components for each fixture such that a fixture may be reconstructed in the future when needed.

Modular fixtures that have been proposed have not been without their own difficulties. One type of modular fixture utilizes a vacuum source in order to retain objects on the fixture. Not only is such system expensive, it is prone to failure, especially when supporting parts in a vertical orientation, and is not useful at supporting all types of objects. Another modular system, which is made up of unique manufactured components, operates reasonably well. However, the manufactured components are built to close tolerances and are exceptionally expensive to produce. While this system is useful in supporting small objects, the nature of its components requires a large number of components to support large objects, such as fenders of vehicles, vehicle door panels, and the like with sufficient rigidity.

There is a need for a modular fixturing system which is capable of providing exceptional flexibility in the design and construction of object support fixtures. Such system should be capable of supporting objects, even large objects, in any orientation that is most advantageous to the manufacturing process. For example, vehicle side panels, such as fenders and door panels, must be supported in their vertical orientation during CMM inspection in order to avoid deviations resulting from the force of gravity on the object. Such modular fixturing system must additionally be inexpensive to produce without requiring precision manufacturing tolerances of the components making up the system.

SUMMARY OF THE INVENTION

The present invention overcomes the difficulties of the prior art by providing a modular-fixturing system which is capable of supporting objects, even large objects, in any orientation that is most advantageous to the manufacturing process. This is accomplished with a minimum number of basic components which allow a fixture to be constructed to the approximate configuration needed to support the object with means provided for attachment of conventional object-engagement components of the type known in the industry.

The present invention utilizes at least one spacer tube which includes a tubular member having opposite ends closed by cover members. Through-holes in at least one of the cover members are configured to receive fasteners in order to fasten spacer tubes together in a tower configuration. According to an aspect of the invention, an access opening is provided in the tubular member and configured to provide access to the cover member through-holes inside the tubular member by either a tool or by the fingers of a user. This allows the spacer tubes to be interconnected with each other in a tower or to be connected to a base plate.

In a preferred form, each of the cover members of the spacer tube includes an inner portion configured to closely match an inner surface of the tubular member and is joined to the tubular member by an adhesive or the like. Through-holes are preferably provided in both cover members with through-holes in one of the cover members being threaded and through-holes in the other of the cover members being non-threaded. The access opening is adjacent the cover member having the non-threaded through holes in order to allow insertion of fasteners in such non-threaded through-holes for engagement with the threaded through-holes of another spacer tube or a base plate.

According to another aspect of the invention, a spacer tube is provided having a tubular member with a quadrilateral cross section defining opposite sidewall pairs. Matching through-openings are provided in at least one of sidewall pairs and at least one insert is provided to engage the through-openings. The insert has an enlarged head and an elongated body. The body is configured to pass through the through-openings. This provides a unique capability for attaching components to sidewalls of the tubular members. The insert has an axial opening extending through the head and body. One type of insert includes a non-threaded surface for the axial opening. This allows components to be attached to one side of the spacer tube. Another form of the insert includes a threaded surface for the axial opening. This allows the use of the insert to attach components to opposite sides of the spacer tube.

According to yet a further aspect of the invention, the modular tooling fixture includes a base plate made up of a plurality of base plate portions. Each base plate portion is a flat plate having a multiplicity of threaded mounting openings arranged in a matrix fashion. The base plate portions are joined together by elongated extender members. This allows large fixtures to be assembled while reducing the weight and variety of base plates which must be provided to accommodate all possible tooling fixture sizes.

According to yet a further aspect of the invention, a modular tooling system includes first and second members, each having a wall and a threaded through-opening in that wall. The members are joined together by a dowel-fastener having a threaded fastener portion that is configured to th readably engage one of the threaded through-openings and has a dowel portion to slidably engage a threaded opening in the other threaded through-opening. Preferably, the dowel-fastener is a double-threaded stud, having another threaded fastener portion with smaller threads than the threaded fastener portion and extending from the dowel portion in order to receive a rotating fastener.

These and other objects, advantages and features of this invention will become apparent upon review of the following specification in conjunction with the drawings.

BRIEF DESCRIPTION OF THE DRAWINGS

FIG. 7a is a sectional view illustrating a dowel fastener utilized to interconnect a base plate to an extender member according to the invention;

FIG. 10 is a side elevation of a bridge spacer tube according to the invention;

FIG. 11 is a view taken in the direction XI—XI in FIG. 10;

FIG. 12 is a view taken in the direction XII—XII in FIG. 11;

DESCRIPTION OF THE PREFERRED EMBODIMENT

Figure 1:
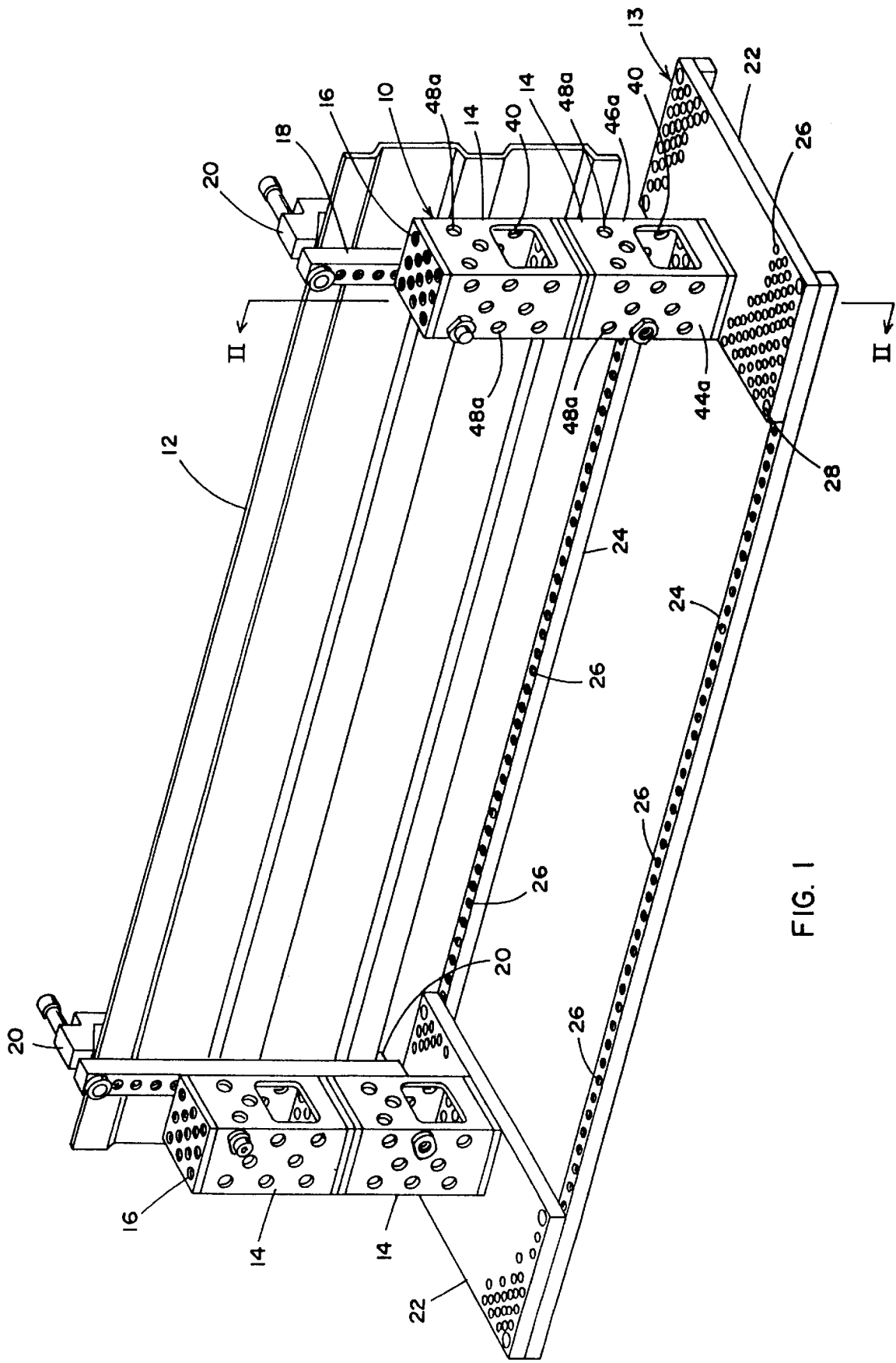
FIG. 1 is a perspective view of a modular tooling fixture, according to the invention, illustrated supporting an object.

Referring now specifically to the drawings, and the illustrative embodiments depicted therein, a modular tooling fixture 10 is illustrated supporting an object 12, which may be a component of an automobile, an appliance, or any other object undergoing a light-manufacturing process, including CMM inspection (FIG. 1). Modular tooling fixture 10 includes a base plate 13 and one or more spacer tubes 14. In the illustrated embodiment, two vertically stacked spacer tubes 14 are joined together to form each of two spaced apart towers 16. Vertical bars 18 are attached to each tower 16 in order to provide mounting points for components 20 which engage object 12 in order to support the object in the desired orientation which, in the illustrated embodiment, is a vertical orientation. Components 20 are conventional components known in the industry, such as support balls, hooks, spring-biased fasteners, and the like, and can be attached directly to towers 16.

In the illustrated embodiment, towers 16 are widely spaced apart. In order to efficiently accommodate such configuration, without adding substantial weight and cost, base plate 13 is made up of a pair of base plate portions 22 which are joined together by one or more elongated extender members 24. Each base plate portion 22 and extender members 24 include a plurality of threaded fastener openings 26 arranged in rows. As will be set forth in more detail below, this allows spacer tubes 14, as well as other components, to be mounted to the base plate portions and allows the base plate portions to be joined to the extender members 24. Base plate portions 22 may additionally include one or more through-openings 28, preferably positioned at outer corners of the base plate portion. Such through-openings 28 may be utilized to connect the base plate portions to the extender members utilizing conventional fasteners, such as cap screws. However, the base plate portions may be attached to the extender members utilizing the threaded fastener openings 26 on both the base plate portions and extender members utilizing a dowel-fastener 30 in a manner which will be described in detail below.

Figure 2:
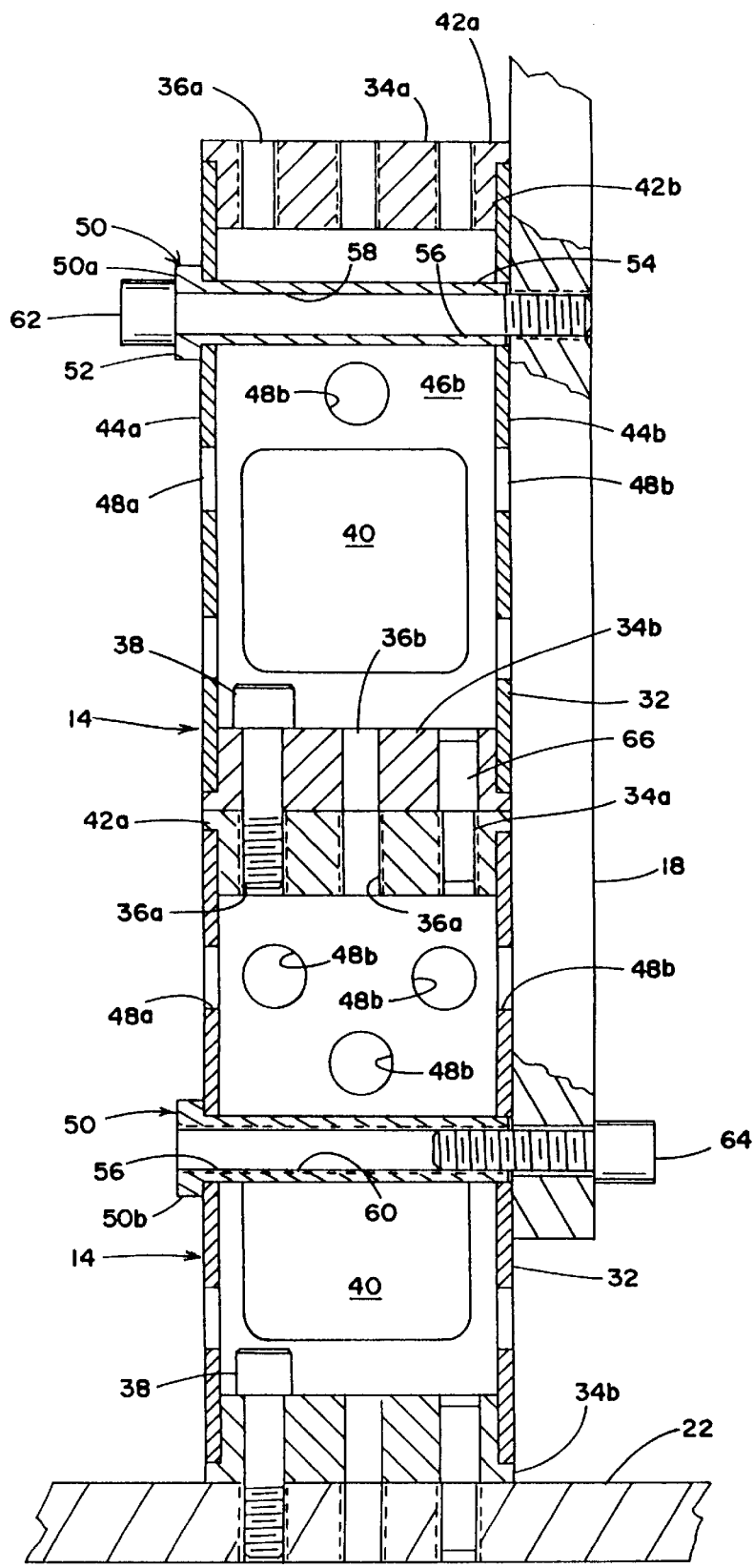
FIG. 2 is a sectional view taken along the lines II—II in FIG. 1.

Each spacer tube 14 includes a tubular member 32 and a pair of cover members 34a, 34b closing opposite ends of the tubular member (FIG. 2). Cover member 34a has a plurality of through-holes 36a which are threaded. Cover member 34b has a plurality of through-holes 36b which are not threaded. In this manner, spacer tubes 14 may be joined by their cover members by passing conventional fasteners, such as socket-head cap-screws 38, through holes 36b of cover member 34b and threadably engaging through-holes 36a of cover member 34a. In order to facilitate such engagement, an access opening 40 is provided in tubular member 32 and configured in order to receive a tool or fingers of the user (not shown) when inserting and tightening fastener 38. As such, access opening 40 is preferably positioned adjacent cover member 34b. Cover members 34a and 34b each have an enlarged outer portion 42a and a reduced inner portion 42b. Inner portion 42b is configured to closely match the inner dimensions of the walls of tubular member 32. In this manner, cover members 34a and 34b may be attached to tubular member 32 by the use of an adhesive such as the type marketed under the brand Loctite, Models 620 and 638, which are capable of withstanding an anodizing process. In the illustrated embodiment, tubular member 32 is extruded aluminum and cover members 34a, 34b are machined aluminum. Both are anodized in order to preserve their surface characteristics. However, other materials, such as steel and structural plastics, may be used.

In the illustrated embodiment, tubular member 32 is a quadrilateral member defining two pairs of opposite sidewalls 44a, 44b and 46a, 46b. A plurality of matched through-openings 48a, 48b are defined in sidewall pairs 44a, 44b and 46a, 46b. In the illustrated embodiment, through-openings 48a, 48b are configured to be larger than through-holes 36a, 36b, although they could be of the same or smaller diameter than the through-holes. Through-openings 48a, 48b are configured to receive an insert 50 according to the invention. Insert 50 includes an enlarged head 52 and a body 54, the body being configured to pass through through-openings 48a, 48b. An axial opening 56 is defined in insert 50 through head 52 and body 54. Insert 50 comes in two forms. In one form of an insert, designated 50a, axial opening 56 has a non-threaded surface 58. In another form of an insert, designated 50b, axial opening 56 has a threaded surface 60. Non-threaded surface 58 allows a conventional fastener, such as a cap screw 62, to pass through head 52 and body 54 of insert 50a in order to threadably engage a threaded opening of a component, such as bar 18, to be attached to the sides of spacer tubes 14 as illustrated in FIG. 2. The threaded surface 58 of insert 50b allows components to be th readably attached on opposite sides of spacer tube 14. As illustrated in FIG. 2, a fastener 64 may pass through a non-threaded opening in a component, such as bar 18, and threadably engaged threaded surface 60 of insert 50b. Another component (not shown) could be attached to the head-end of insert 50b by th readably engaging threaded surface 60 thereof. Each insert 50 has a length L of body 54 which is greater than the inner spacing of sidewalls 44a, 44b but less than the outer spacing of sidewalls 44a, 44b. This ensures that fasteners, such as fastener 62, 64, will draw the component, such as bar 18, firmly against the sidewalls of spacer tubes 14. However, over-tightening of fastener 62, 64 will not result in permanent deformation of sidewalls 44a, 44b or 46a, 46b.

In order to join spacer tubes 14 in an end-to-end configuration, as illustrated in FIG. 2, one or more dual-diameter dowels 66 may be used in combination with one or more fasteners 38. Dowels 66 include a large diameter portion 68, which is sized to the diameter of non-threaded through-holes 36b, and a small diameter portion 70, which is sized to engage the inner diameter of the threads of through-holes 36a.

Figure 7:
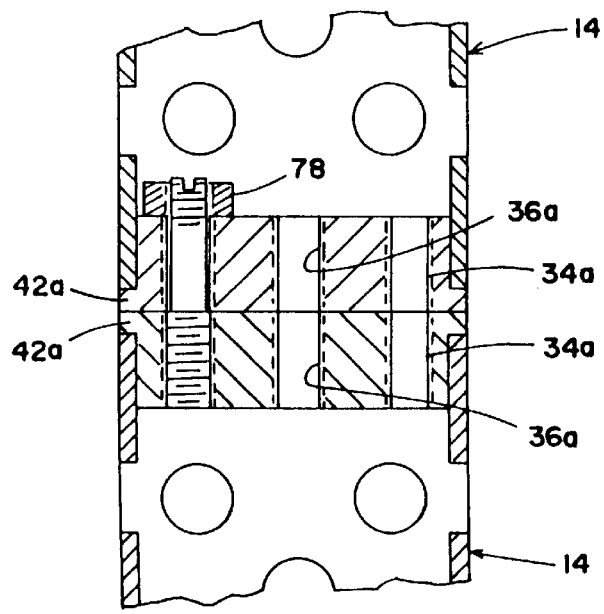
FIG. 7 is a sectional view illustrating a dowel-fastener utilized to interconnect two threaded openings.
Figure 5:
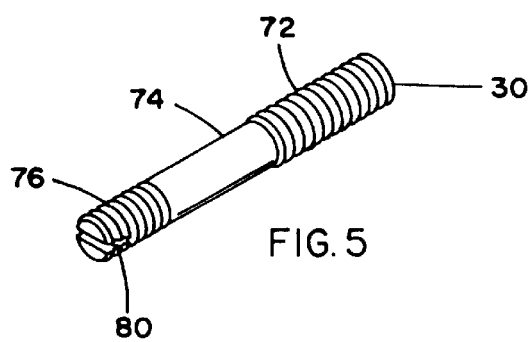
FIG. 5 is a perspective view of a dowel-fastener according to the invention.
Figure 6:
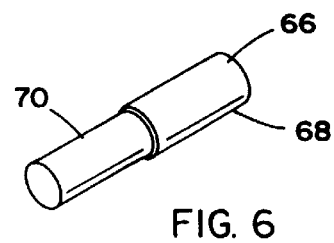
FIG. 6 is a perspective view of a dual-diameter dowel according to the invention.
Figure 3:
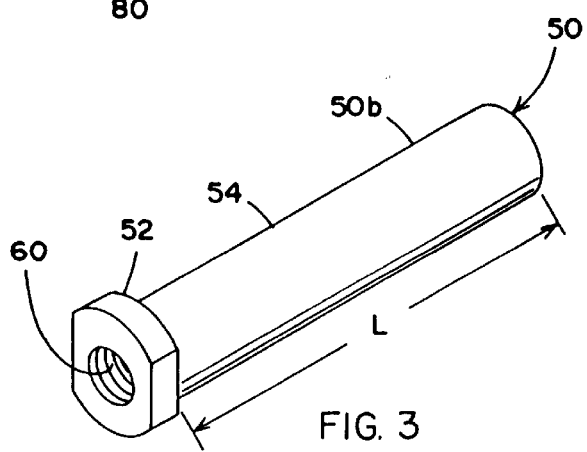
FIG. 3 is a perspective view of an insert according to the invention.
Figure 4:
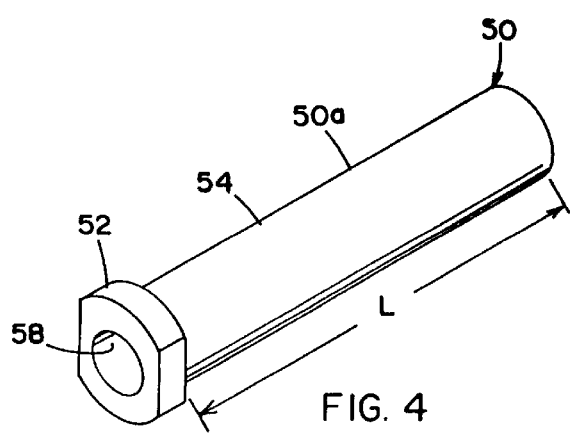
FIG. 4 is a the same view as FIG. 3 of another insert according to the invention.

If it is desired to join two spacer tubes 14 with cover members 34a abutting each other, or to join any pair of threaded openings in a modular tooling fixture 10, dowel-fastener 30 is utilized (FIGS. 5 and 7). Dowel-fastener 30 includes a first threaded portion 72 which is configured to threadably engage threaded through-holes 36a, or other threaded openings. Dowel-fastener 30 includes a dowel portion 74 having an outer diameter configured to the inner diameter of threaded through-holes 36a, or other threaded opening. This allows dowel portion 74 to stabilize the alignment of one cover member 34a with the other cover member 34a because the close engagement between dowel portion 74 and the inner diameter of the threads of threaded through-hole 36a prevents substantial lateral shift of the spacer tubes. Dowel-fastener 30 additionally includes a smaller threaded portion 76 having threads sufficiently small to pass through threaded through-holes 36a and receive a rotating fastener 78, such as a nut or the like. Dowel-fastener 30 may additionally include a slot 80 in one end in order to facilitate threadable engagement of threaded portion 72 with threaded through-hole 36a. As previously set forth, one or more dowel-fasteners 30 may be utilized to join extender members 24 with threaded fastener openings 26 of base plate portions 22 or any combination of threaded openings on modular tooling fixture 10.

Figure 8:
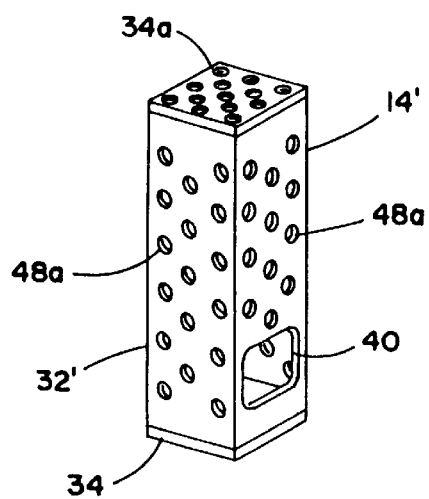
FIG. 8 is a perspective view of an alternative embodiment of a spacer tube according to the invention.

An alternative embodiment of a spacer tube 14' is illustrated in FIG. 8. Spacer tube 14' includes a tubular member 32' which is substantially longer than that used in spacer tube 14 and may be utilized for taller tower assemblies 16 in combination with other spacer tubes 14' or with other spacer tubes 14. Spacer tube 14' includes cover members 34a, 34b and an access opening 40 adjacent cover member 34b. Spacer tubes 14, 14' may have one access opening 40 or two or more access openings 40. One access opening 40 is preferred in order to impart additional strength to the spacer tube.

Figure 9A:
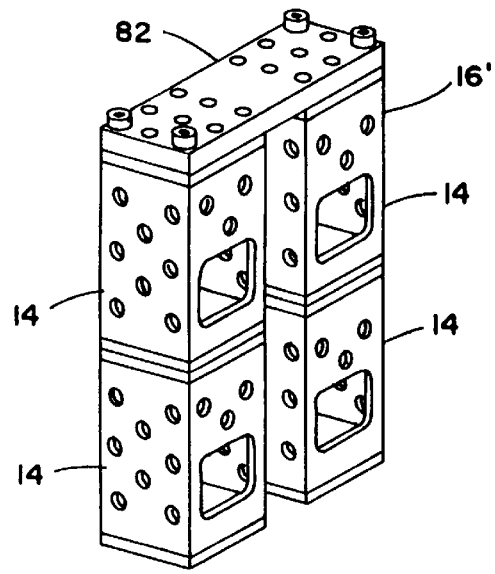
FIGS. 9a–9c are illustrations of various arrangements of spacer tubes.
Figure 9B:
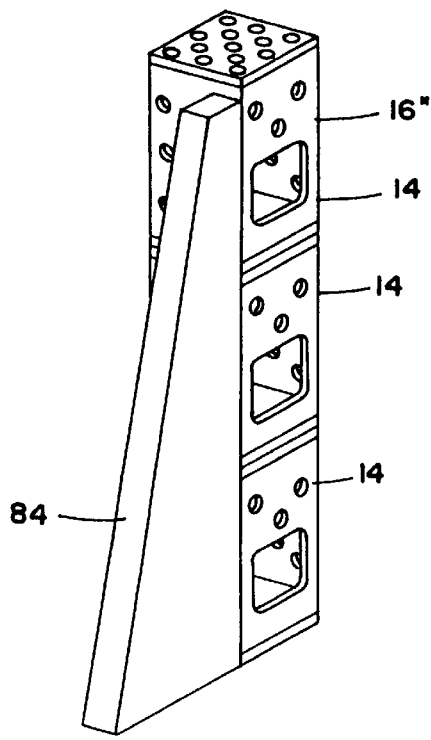
Figure 9C:
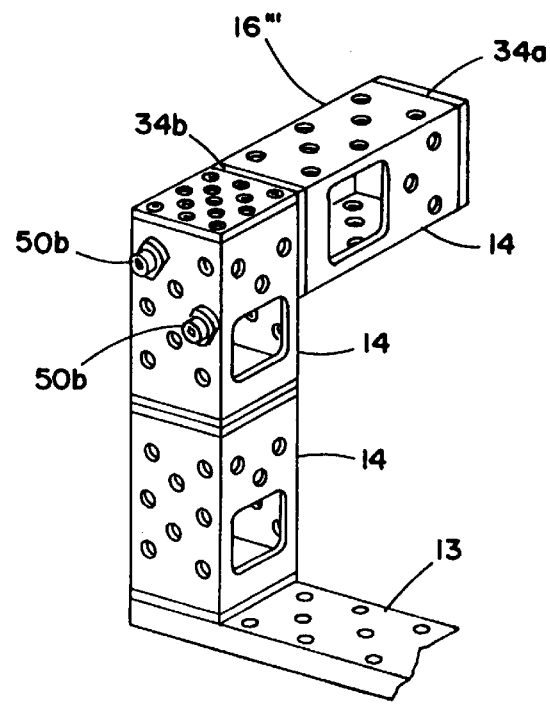

Examples of towers constructed according to the invention are illustrated in FIGS. 9a–9c. In FIG. 9a, a tower 16' is made up of four spacer tubes 14 joined in two end-to-end pairs and coupled together with a plate 82. Alternatively, the pairs of spacer tubes 14 could be joined together by their respective sidewalls in order to eliminate the necessity for a plate 82. In FIG. 9b, a tower 16" is illustrated having multiple end-to-end spacer tubes 14 which are stabilized by a support 84. In FIG. 9c, a tower 16'" is made from a pair of spacer tubes 14 joined end-to-end to a base plate 13. A third spacer tube 14 is joined to the uppermost of the pair of spacer tubes 14 by a pair of inserts 50b whose threaded axial openings are engaged by fasteners, such as cap screws (not shown), extending through through-holes 36b of cover member 34b of spacer tube 14. Alternatively, cover member 34a of the third spacer tube 14 could be joined with the use of inserts 50b and a pair of fasteners, such as cap screws, extending entirely through the axial openings of the inserts and th readably engaging the threaded through-holes 36a of cover member 34a.

Figure 14:
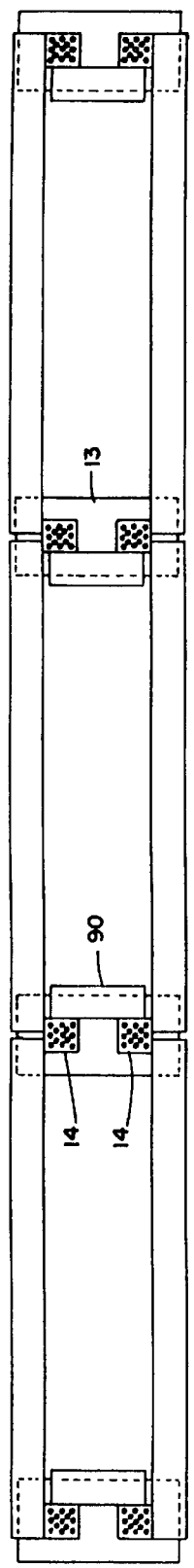
FIG. 14 is a view taken in the direction XIV—XIV in FIG. 13.
Figure 13:
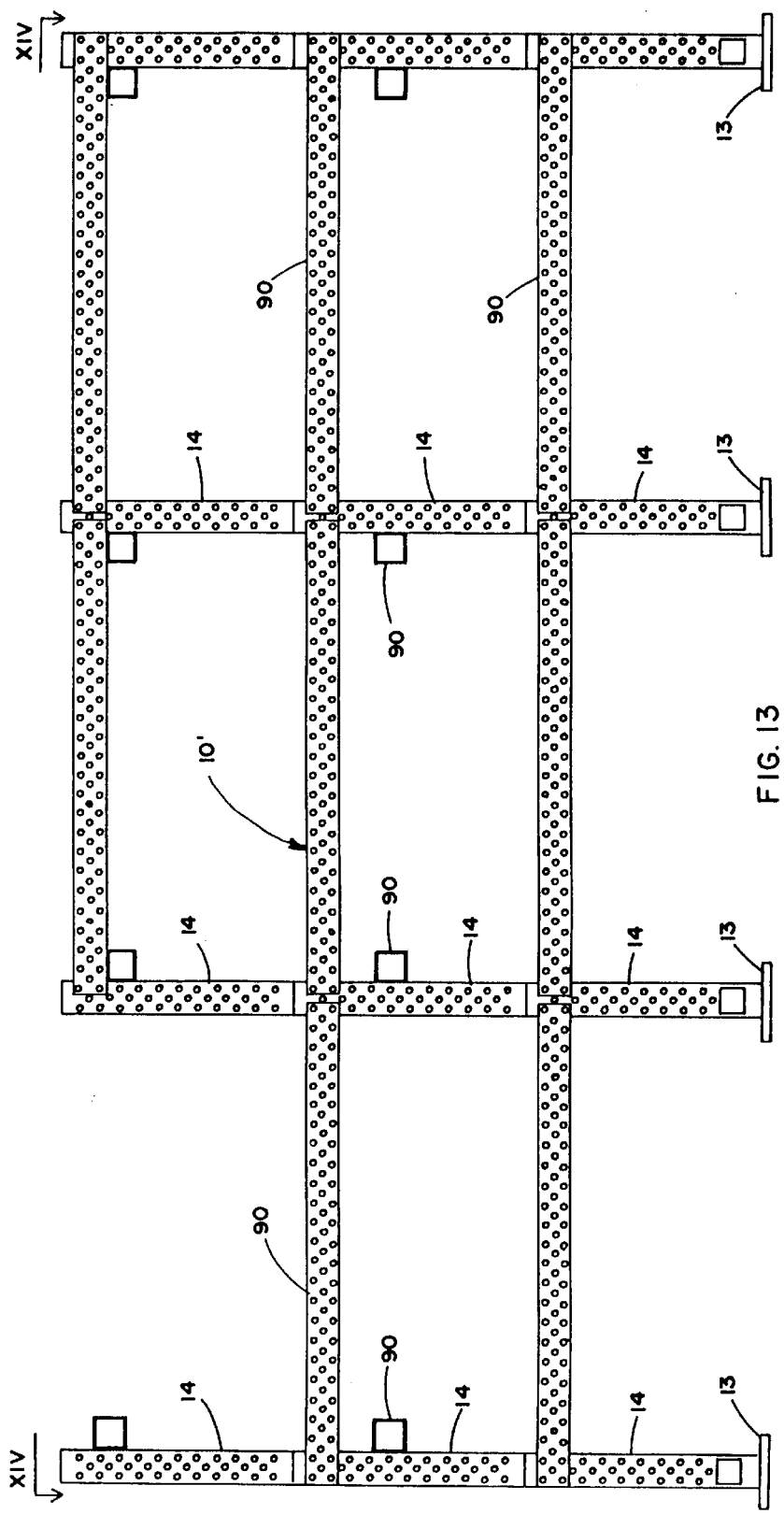
FIG. 13 is a side elevation of another modular tooling fixture according to the invention.

Another form of a modular tooling fixture 10' uses a bridge spacer tube 90 (FIGS. 11–14). Bridge spacer tube 90 includes opposing side walls 44a, 44b and 46a, 46b which may all include opposing through-openings 48, although openings are provided in only one pair of side walls in the illustrated embodiment. Bridge spacer tubes 90 are primarily for providing horizontal support and cross-bracing, as illustrated in FIGS. 13 and 14. As such, spacer tubes do not require cover members at opposite ends thereof. Bridge spacer tubes 90 are connected with spacer tubes 14 by inserts 50 extending in through-openings 48. One insert 50 would extend in the through-openings in spacer tube 14 and another insert 50 would extend in the through-openings in bridge spacer tube 90. The inserts would be joined by fasteners in a manner which would depend, in part, on whether the inserts utilized both had non-threaded surfaces 58 or one had a threaded surface 60. Alternatively, bridge spacer tubes could be attached directly to base plates in order to provide elevation.

The present invention provides for exceptionally rigid support fixtures which can range from very small to very large sizes. This is accomplished with a minimum number of components thereby reducing both part count as well as the labor required to design and assemble a fixture. This is accomplished without sacrificing versatility which is desirable in order to provide optimal support at desired locations for the object to be supported. This is further accomplished by utilizing spacer tubes which may be easily manufactured in a manner which accommodates ease of assembly with other components including other spacer tubes. The use of base plate portions and extenders in order to assemble base plates further facilitates the ability to produce a wide range of fixture sizes without unduly adding to the weight and cost of the fixtures.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A modular tooling fixture, comprising:

at least one spacer tube comprising a tubular member having a quadrilateral cross section defining opposite sidewall pairs, said tubular member having matching through-openings having a substantially similar size with respect to one another in at least one of said opposite sidewall pairs, said at least one of said opposite sidewall pairs having a pair of inner surfaces defining a spacing therebetween and a pair of outer surfaces defining a spacing therebetween; and at least one insert having an enlarged head and an elongated body, said body configured to pass through a pair of said matching through-openings and said body having a length that is greater than said spacing between said pair of inner surfaces and less than the spacing between said pair of outer surfaces, said insert including a fastener opening extending axially through said head and said body whereby a fastener in said fastener opening will not substantially deform said at least one of said opposite sidewall pairs.

2. The modular tooling fixture in claim 1 wherein said cross section is square. are defined by an extruded member.

3. The modular tooling fixture in claim 1 including cover members on opposite ends of said spacer tube, said cover members having through-holes configured to receive fasteners.

4. The modular tooling fixture in claim 3 wherein said through-holes in one of said cover members are threaded and said through-holes in the other of said cover members are non-threaded.

5. The modular tooling fixture in claim 3 including an access opening in said tubular member configured to provide access to an inside of said tubular member to enable a tool to access said cover member through-holes from within said tubular member.

6. The modular tooling fixture in claim 5, wherein said access opening in said tubular member is configured to provide access to said inside of said tubular member to enable fingers to access said cover member through-holes form within said tubular member.

7. The modular tooling fixture in claim 3 wherein each of said cover members includes an inner portion configured to closely match said pair of inner surfaces of said tubular member.

8. The modular tooling fixture in claim 7 including an adhesive at least partially joining each of said inner portions and said pair of inner surfaces.

9. The modular tooling fixture in claim 1 wherein said fastener opening includes a non-threaded surface.

10. The modular tooling fixture in claim 1 wherein said fastener opening includes a threaded surface.

11. A modular tooling fixture, comprising:
    a first spacer tube having a first end and a second end, said first end closed by a first cover member, said first cover member being a plate having a first threaded through-opening;
    a second spacer tube having a first end and a second end, said second spacer tube second end closed by a second cover member, said second cover member a plate having a second threaded through-opening, said second spacer tube positioned atop said first spacer tube so that said first cover member is abutting said second cover member; and
    said first and second spacer tubes joined by a dowel-fastener having a threaded fastener portion threadably engaging said first threaded through-opening, a dowel portion slidably engaging said second threaded through-opening and a second threaded fastener portion having threads that are smaller in diameter than a diameter of said threaded fastener portion and extending from said dowel portion opposite said threaded fastener portion, and a rotating fastener engaging said second threaded fastener portion.

12. A modular tooling fixture in claim 11 includes at least one tooling opening having a particular size and an access opening, said at least one tooling opening configured to receive tooling fasteners for mounting elements to the tooling fixture, and said access opening having a size that is substantially larger than said particular size of said at least one tooling opening.

13. A modular tooling fixture including a base plate and a plurality of spacer tubes, at least one of said spacer tubes connected with said base plate and said plurality of spacer tubes interconnected with each other by connecting fasteners, at least one of said spacer tubes comprising:
    an elongated structure formed by a plurality of side walls and at least two opposite end walls joined with said side walls;
    a plurality of connecting openings formed in, said connecting openings said end walls configured to receive said connecting fasteners;
    at least one tooling opening having a particular size formed in one of said side walls, said at least one tooling opening configured to receive tooling fasteners for mounting elements to said one of said sidewalls;
    an access opening having a size that is substantially larger than said particular size of said at least one tooling opening, said access opening being formed in said one of said side walls adjacent one of said end walls;
    said access opening and said at least one tooling opening are positioned on said one of said side walls in a manner to be concurrently accessible; and
    said plurality of side walls are arranged in opposite parallel pairs and said at least one tooling opening comprises a pair of aligned tooling openings, each of said aligned tooling openings being formed in a respective sidewall of one of said opposite parallel pairs of sidewalls.

14. The modular tooling fixture in claim 13 wherein said plurality of side walls are defined by an extruder member.

15. The modular tooling fixture in claim 13 wherein said one of said side walls has a width and said access opening has a width that spans more than half of the width of said one of said side walls.

16. The modular tooling fixture in claim 13 wherein each of said spacer tubes is a unitary structure.

17. The modular tooling fixture in claim 13 wherein said end walls each have a thickness that is substantially greater than a thickness of each of said side walls.

18. The modular tooling fixture in claim 13 wherein said plurality of connecting opening comprise at least one threaded through-opening formed in one of said end walls and at least one non-threaded through-opening formed in the other of said walls.

19. The modular tooling fixture in claim 13 wherein each of said end walls includes an inner portion having outer surfaces configured to closely match inner surfaces formed by said plurality of side walls.

20. The modular tooling fixture in claim 19 including an adhesive at least partially joining each of said inner portions to said inner surfaces.

* * * * *

UNITED STATES PATENT AND TRADEMARK OFFICE
CERTIFICATE OF CORRECTION

PATENT NO. : 5,887,733
DATED : March 30, 1999
INVENTOR(S) : Robert A. Harvey and H. James Vander Wal, III It is certified that error appears in the above-identified patent and that said Letters Patent is hereby corrected as shown below:

Abstract, line 16:
After "members", insert --,--.

Abstract, line 26:
After "through-holes", delete "defined in said sidewall pairs".

Abstract, line 28:
After "an", delete "matching".

Column 2, line 60:
After "to", delete "th".

Column 2, line 61:
"readably" should be --threadably--.

Column 4, line 62:
"th readably" should be --threadably--.

Column 5, line 1:
"th readably" should be --threadably--.

Column 7, claim 2, line 4:
After "square.", delete "are defined by an extruded member.".

Column 7, claim 3, line 6:
"tube,said" should be --tube, said--.

Column 7, claim 6, line 22:
"form" should be --from--.

Column 7, claim 11, line 42:
After "member", insert --being--.

UNITED STATES PATENT AND TRADEMARK OFFICE
CERTIFICATE OF CORRECTION

PATENT NO.     :   5,887,733
DATED          :   March 30, 1999
INVENTOR(S)    :   Robert A. Harvey and H. James Vander Wal, III It is certified that error appears in the above-identified patent and that said Letters Patent is hereby corrected as shown below:

Column 8, claim 13, line 14:
    After "in", insert --said end walls--.

Column 8, claim 13, line 15:
    After "openings", delete "said end walls".

Column 8, claim 14, line 35:
    "extruder" should be --extruded--.

Column 8, claim 18, line 46:
    "opening" should be --openings--.

Column 8, claim 18, line 49:
    After "said", insert --end--.

Signed and Sealed this

Fourteenth Day of December, 1999

Attest:

Q. TODD DICKINSON

Attesting Officer

Acting Commissioner of Patents and Trademarks